US 8,060,238 B2

(12) United States Patent
Tsai et al.

(10) Patent No.: US 8,060,238 B2
(45) Date of Patent: Nov. 15, 2011

(54) METHOD OF CALCULATING RECOVERY COMMANDS FOR NUMERICAL CONTROLLED SYSTEM

(75) Inventors: Ching-Hsiung Tsai, Tapuian Shien (TW); Jia-ming Wu, Taoyuan Shien (TW); Tsung-Hsin Cheng, Taoyuan Shien (TW)

(73) Assignee: Delta Electronics, Inc., Taoyuan (TW)

( * ) Notice: Subject to any disclaimer, the term of this patent is extended or adjusted under 35 U.S.C. 154(b) by 393 days.

(21) Appl. No.: 12/388,808

(22) Filed: Feb. 19, 2009

(65) Prior Publication Data

US 2010/0211234 A1   Aug. 19, 2010

(51) Int. Cl.
*G06F 19/00* (2006.01)
(52) U.S. Cl. .......................... 700/189; 700/188; 700/302
(58) Field of Classification Search .................. 700/188, 700/189, 302
See application file for complete search history.

(56) References Cited

U.S. PATENT DOCUMENTS

| 3,882,304 | A | * | 5/1975 | Walters | 700/163 |
| 4,262,336 | A | * | 4/1981 | Pritchard | 700/169 |
| 5,726,896 | A | * | 3/1998 | Jia et al. | 700/187 |
| 6,470,225 | B1 | * | 10/2002 | Yutkowitz | 700/44 |
| 6,772,020 | B2 | * | 8/2004 | Kohler et al. | 700/73 |
| 6,934,601 | B2 | * | 8/2005 | Hirai et al. | 700/194 |

OTHER PUBLICATIONS

"Motion Controller Design for Contour-Folowing Tasks Based on Real-Time Contour Error Estimation", Cheng et al, IEEE vol. 54, No. 3, Jun. 2007.*

* cited by examiner

*Primary Examiner* — Michael D Masinick
(74) *Attorney, Agent, or Firm* — Chun-Ming Shih; HDLS IPR Services

(57) ABSTRACT

A method of calculating recovery commands for numerical controlled system that an upper controller provides position commands to a servo driver to drive a motor. A memory space is provided to store the position commands, and then a position matrix and a transformation matrix are read. Finally, the transformation matrix is multiplied by the position matrix to calculate the coefficients of a position polynomial and a plurality of position interpolations. In addition, a velocity polynomial and an acceleration polynomial can be calculated. Therefore, the position commands are calculated to recovery as a high-order differentiable continuous polynomial to synchronize the servo driver and the upper controller.

7 Claims, 4 Drawing Sheets

METHOD OF CALCULATING RECOVERY COMMANDS FOR NUMERICAL CONTROLLED SYSTEM

BACKGROUND OF THE INVENTION

1. Field of the Invention

The present invention relates to a method of calculating recovery commands for a numerical controlled system, and more particularly to a method of calculating recovery commands for recovering a high-order differentiable continuous polynomial for a numerical controlled system.

2. Description of Prior Art

Motion control is the core technique in the precision machining tools, and applications scope of the motion control includes industrial machines for a position control or a velocity control, and further includes computerized numerical control (CNC) machine tools for a high-precision control. A motion control system is integrated with various software and hardware techniques, so cost, stability, use frequency, maintaining service of the motion control system and even scalability and interoperability of the software and the hardware are important factors for evaluating the motion control system. Furthermore, both position and velocity of all spindles of the machine tool are practically taken into account to determine controlling quality of the machine tool.

The CNC machine tools mean that the computerized numerical control system is installed in the machine tool, and the computerized numerical control system receives and calculates inputted data and afterward sends commands to control operating conditions, such as spindle rotation, cutting tool replacement, cutting motion, coolant switch, or so on, to achieve expected control.

During the process of CNC machine tools, original data (such as geometric shape and outline size) and corresponding instructions are provided to calculate a plurality of interpolations to process accurately a contour curve between a starting point and an end point of an unprocessed material.

U.S. Pat. No. 6,772,020 disclosed an arrangement for generating command variables for control loops of a numerically controlled machine that includes an interpolator unit for providing position set points with a defined interpolator scanning rate and a precision interpolator unit. The precision interpolator unit includes a scanning rate converter and a downstream-connected low-pass filter, wherein the precision interpolator unit is arranged downstream of the interpolator unit, which generates command variables at an output side from position set points at an input side for one or several downstream-connected control loops, wherein the precision interpolator unit generates command variables in a time pattern of the control loops with a control loop scanning rate. The command variables for the control loops are implemented to adopt a structure of a two-order filter, and the filter is also designed to match the numerically controlled machine. However, it does not render a higher-order differentiability for resultant path curves. The practicability of the numerically controlled machine is reduced due to high complexity of the command-generating arrangement.

SUMMARY OF THE INVENTION

Accordingly, a method of calculating recovery commands for recovering a high-order differentiable continuous polynomial for a numerical controlled system and for synchronizing the commands between a servo driver and an upper controller.

In order to achieve the objectives mentioned above, a method of calculating recovery commands for a numerical controlled that an upper controller provides position commands to a servo driver to drive a motor. Steps of the method are described as follows: First, a memory space is provided by the servo driver to store position commands. Afterward, a position matrix and a transformation matrix are read. The transformation matrix is multiplied by the position matrix to acquire a plurality of position coefficients of a position polynomial, and a plurality of position interpolations are calculated. In addition, a velocity polynomial and an acceleration polynomial can be acquired. Accordingly, the position commands are calculated to recovery as a high-order differentiable continuous polynomial to synchronize the servo driver and the upper controller.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
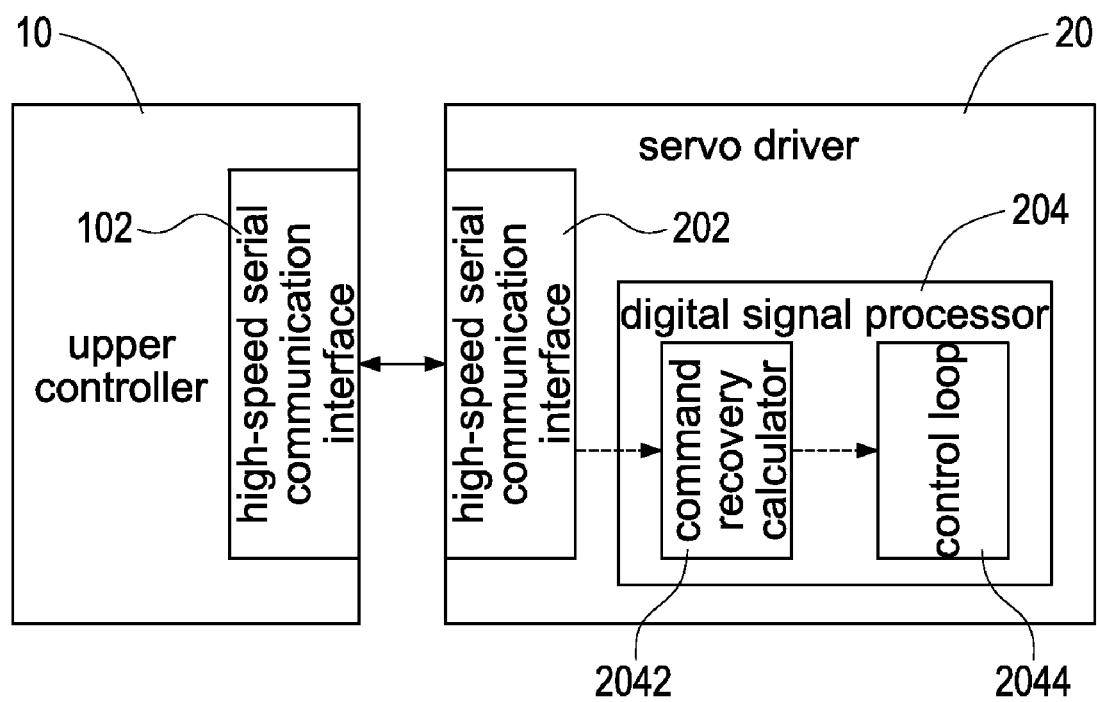
FIG. 1 is a schematic view of communicating between an upper controller and a servo driver according to the present invention.

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Reference will now be made to the drawing figures to describe the present invention in detail.

Reference is made to FIG. 1 which is a schematic view of communicating between an upper controller and a servo driver according to the present invention. An electrical system of a computerized numerical control (CNC) machine tool is taken as an example. The upper controller 10 generates periodic position data via a G-code interpreter (not shown). The upper controller 10 is electrically connected to a servo driver 20, and sends pulse position commands θ(i) to the servo driver 20. The position commands θ(i) are transmitted between the upper controller 10 and the servo driver 20 via a transmission line. The upper controller 10 and the servo driver 20 have a high-speed serial communication interface 102, 202, respectively. The period of the position commands θ(i) transmitted from the upper controller 10 is T (seconds), and the period of the position commands θ(i) received to the servo driver 20 is also T (seconds). In addition, a sampling time of a digital signal processor (DSP) 204 installed in the servo driver 20 is H (seconds). If the period of the position commands θ(i) received by the servo driver 20 is 0.5 milliseconds (T=0.5 ms), the sampling time of the digital signal processor 204 is 0.05 milliseconds (H=0.05 ms). Hence, the digital signal processor 204 provides nine interpolations to compensate the position commands θ(i) in 0.5 milliseconds.

A command recovery calculator 2042 is provided by the digital signal processor 204, and a control loop 2044 is further used to recovery the position commands θ(i) to a high-order differentiable continuous polynomial.

Figure 2:
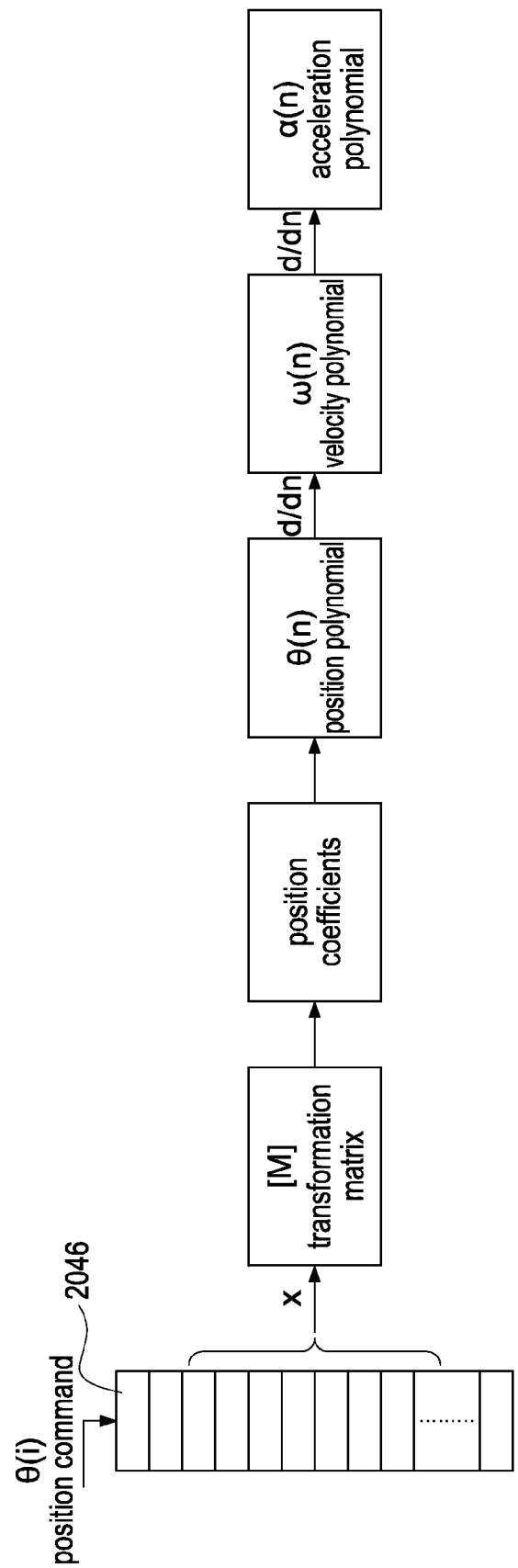
FIG. 2 is a schematic view of calculating recovery commands.
Figure 3:
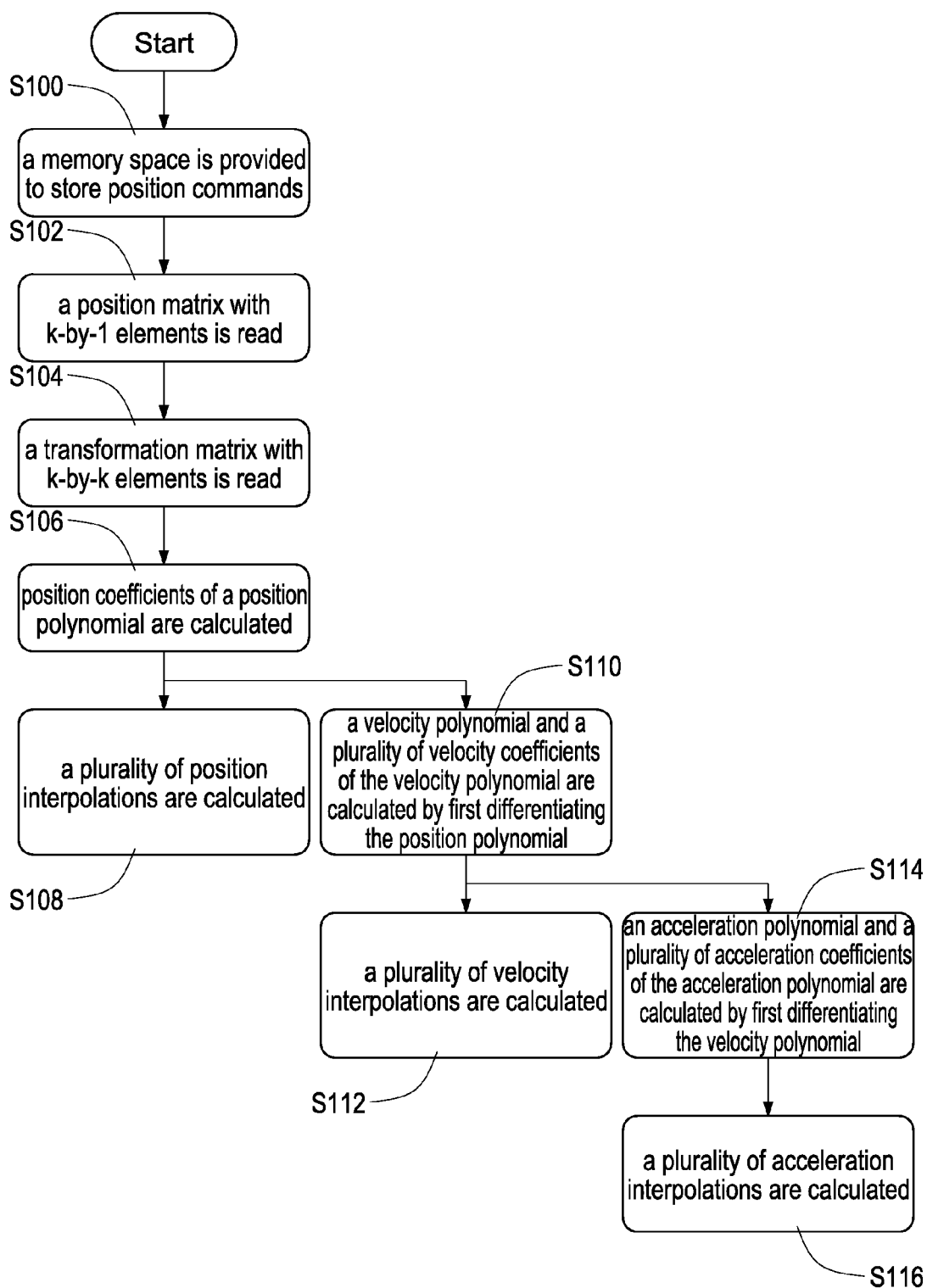
FIG. 3 is a flowchart of calculating recovery commands.

References are made to FIG. 2 and FIG. 3 which are a schematic view of calculating recovery commands and a flowchart of calculating recovery commands, respectively. A detail description of calculating recovery commands is as follows: First, a memory space 2046 is provided by the servo driver 20 to store position commands θ(i) (S100), and the position commands θ(i) are transmitted to the servo driver 20 from the upper controller 10. The position commands θ(i) are stored in the memory space 2046 using the queue (first-in-first-out, FIFO) approach to form a position matrix with k-by-1 elements. The position matrix has one current position element θ(0) and (k−1) preceding position elements θ(−1),θ(−2),θ(−3), . . . , and θ(k−1). A position polynomial θ(n) of degree (k−1) is defined. Let the k be equal to 6, namely the degree of the position polynomial θ(n) is 5, to exemplify the position polynomial θ(n). Also, the position polynomial θ(n) of degree 5 is expressed as follows:

$$\theta(n)=a_5*n^5+a_4*n^4+a_3*n^3+a_2*n^2+a_1*n+a_0 \quad \text{(equation 1)}$$

Afterward, the position matrix with k-by-1 elements is read (S102). When k is equal to 6, the position matrix has six elements, which are the current position element θ(0) and five preceding position elements θ(−1), θ(−2), θ(−3), θ(−4), and θ(−5). Afterward, a transformation matrix M with k-by-k elements is read (S104). The transformation matrix M is a matrix with constant elements, and the elements of the transformation matrix M is determined according to dimension of the transformation matrix M. Hence, the position polynomial θ(n) can be expressed as follows:

$$\theta(0)=a_5*(0)^5+a_4*(0)^4+a_3*(0)^3+a_2*(0)^2 a_1*(0)+a_0 \quad \text{(equation 2.1)}$$

$$\theta(-1)=a_5*(-1)^5+a_4*(-1)^4+a_3*(-1)^3+a_2*(-1)^2+a_1*(-1)+a_0 \quad \text{(equation 2.2)}$$

$$\theta(-2)=a_5*(-2)^5+a_4*(-2)^4+a_3*(-2)^3+a_2*(-2)^2+a_1*(-2)+a_0 \quad \text{(equation 2.3)}$$

$$\theta(-3)=a_5*(-3)^5+a_4*(-3)^4+a_3*(-3)^3+a_2*(-3)^2+a_1*(-3)+a_0 \quad \text{(equation 2.4)}$$

$$\theta(-4)=a_5*(-4)^5+a_4*(-4)^4+a_3*(-4)^3+a_2*(-4)^2+a_1*(-4)+a_0 \quad \text{(equation 2.5)}$$

$$\theta(-5)=a_5*(-5)^5+a_4*(-5)^4+a_3*(-5)^3+a_2*(-5)^2+a_1*(-5)+a_0 \quad \text{(equation 2.6)}$$

The above equations (equation 2.1 to equation 2.6) are expressed in a matrix form as follows:

$$\begin{bmatrix} \theta(0) \\ \theta(-1) \\ \theta(-2) \\ \theta(-3) \\ \theta(-4) \\ \theta(-5) \end{bmatrix} = \begin{bmatrix} 0 & 0 & 0 & 0 & 0 & 1 \\ (-1)^5 & (-1)^4 & (-1)^3 & (-1)^2 & (-1)^1 & 1 \\ (-2)^5 & (-2)^4 & (-2)^3 & (-2)^2 & (-2)^1 & 1 \\ (-3)^5 & (-3)^4 & (-3)^3 & (-3)^2 & (-3)^1 & 1 \\ (-4)^5 & (-4)^4 & (-4)^3 & (-4)^2 & (-4)^1 & 1 \\ (-5)^5 & (-5)^4 & (-5)^3 & (-5)^2 & (-5)^1 & 1 \end{bmatrix} \begin{bmatrix} a_5 \\ a_4 \\ a_3 \\ a_2 \\ a_1 \\ a_0 \end{bmatrix}$$

Also, the transformation matrix M is defined as follows:

$$M = \begin{bmatrix} 0 & 0 & 0 & 0 & 0 & 1 \\ (-1)^5 & (-1)^4 & (-1)^3 & (-1)^2 & (-1)^1 & 1 \\ (-2)^5 & (-2)^4 & (-2)^3 & (-2)^2 & (-2)^1 & 1 \\ (-3)^5 & (-3)^4 & (-3)^3 & (-3)^2 & (-3)^1 & 1 \\ (-4)^5 & (-4)^4 & (-4)^3 & (-4)^2 & (-4)^1 & 1 \\ (-5)^5 & (-5)^4 & (-5)^3 & (-5)^2 & (-5)^1 & 1 \end{bmatrix}^{-1}$$

Afterward, k position coefficients of the position polynomial θ(n) are calculated (S106). The six position coefficients (k=6), that is $a_0$ to $a_5$, can be calculated by the transformation matrix M as follows:

$$\begin{bmatrix} a_5 \\ a_4 \\ a_3 \\ a_2 \\ a_1 \\ a_0 \end{bmatrix} = M \begin{bmatrix} \theta(0) \\ \theta(-1) \\ \theta(-2) \\ \theta(-3) \\ \theta(-4) \\ \theta(-5) \end{bmatrix}$$

Afterward, a plurality of position interpolations are calculated according to the position polynomial θ(n) and the position coefficients (S108). The position commands θ(i) can be calculated by the position polynomial θ(n) of degree (k−1). If i is an integer, the position commands θ(i) are position data transmitted from the upper controller 10, and if i is not an integer, the position commands θ(i) are the position interpolations. For example, nine position interpolations are θ(−0.1), θ(−0.2), θ(−0.3), . . . , and θ(−0.9), respectively, and the nine position interpolations are between θ(0) and θ(−1).

In addition, a velocity polynomial ω(n) of degree (k−2) and a plurality of velocity coefficients of the velocity polynomial are calculated by first differentiating the position polynomial θ(n) (S110). The equation 1 is first differentiated to calculate the velocity polynomial ω(n), that is, ω(n)=dθ(n)/dn as follows:

$$\omega(n)=5a_5*n^4+4a_4*n^3+3a_3*n^2+2a_2*n+a_1 \quad \text{(equation 3)}$$

Afterward, a plurality of velocity interpolations are calculated according to the velocity polynomial ω(n) and the velocity coefficients (S112).

In addition, an acceleration polynomial α(n) of degree (k−3) and a plurality of acceleration coefficients of the acceleration polynomial are calculated by first differentiating the velocity polynomial ω(n) (S114). The equation 3 is first differentiated to calculate the acceleration polynomial α(n), that is, α(n)=dω(n)/dn as follows:

$$\alpha(n)=20a_5*n^3+12a_4*n^2+6a_3*n+2a_2 \quad \text{(equation 4)}$$

Finally, a plurality of acceleration interpolations are calculated according to the acceleration polynomial α(n) and the acceleration coefficients (S116).

The position polynomial θ(n), the velocity polynomial ω(n), and the acceleration polynomial α(n) are in phase to significantly reduce a servo lag between the upper controller 10 and the servo driver 20 according to the equation 1, equation 3, and equation 4.

Figure 4:
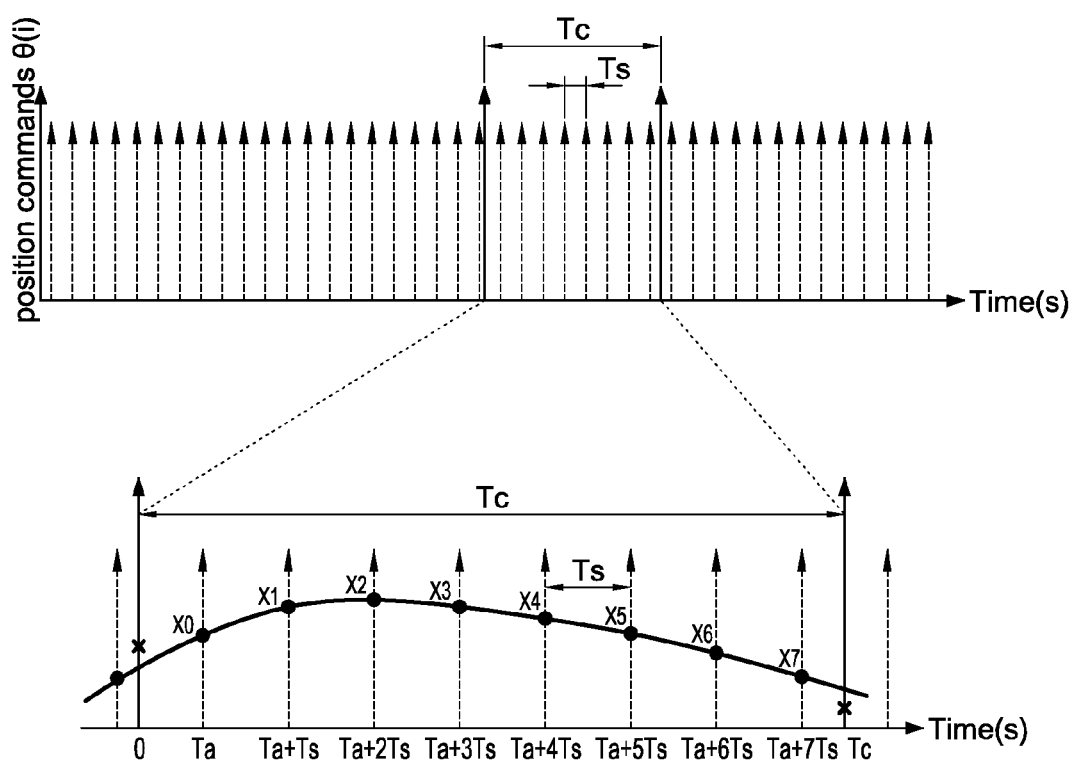
FIG. 4 is a schematic view of position commands are transmitted from the upper controller to the servo driver and sampled by the servo driver.

Reference is made to FIG. 4 which is a schematic view of position commands transmitted from the upper controller to the servo driver and sampled by the servo driver. Because the position commands θ(i) between the servo driver 20 and the upper controller 10 is not synchronous, the position polynomial θ(n) is modified to be a modified position polynomial θ(t) to synchronize the position commands θ(i) between the servo driver 20 and the control loop 2046 of the upper controller 10.

The variable n in the position polynomial θ(n) (equation 1) is replaced by variable t to acquire the modified position polynomial θ(t) (equation 5), wherein t=Ta+n×Ts−Tc. The modified position polynomial θ(t) is expressed as follows:

$$x(t)=a_5*(t)^5+a_4*(t)^4+a_3*(t)^3+a_2*(t)^2+a_1*t+a_0 \quad \text{(equation 5)}$$

wherein Ta is the time of the position commands θ(i) are initially transmitted to the control loop 2046;

Ts is the time of the position commands θ(i), which are sampled by the control loop 2046; and Tc is the period of the position commands θ(i) of the upper controller 10.

Also, a plurality of sampled position commands x0, x1, . . . , x7 of the control loop 2046 can be calculated according to the equation 5.

Similarly, a modified velocity polynomial ω(t) can be calculated by first differentiating the modified position polynomial θ(t), and a modified acceleration polynomial α(t) can also be calculated by first differentiating the modified velocity polynomial ω(t).

In conclusion, the present invention has following advantages:

1. The position commands transmitted from the upper controller to the servo driver can be calculated to recover as a high-order differentiable continuous polynomial.

2. The position polynomial, the velocity polynomial, and the acceleration polynomial are in phase to significantly reduce a servo lag between the upper controller and the servo driver.

3. It is simple to calculate position coefficients, position interpolations, velocity coefficients, velocity coefficients, acceleration coefficients, and acceleration coefficients according to the transformation matrix with constant elements.

4. A plurality of sampled position commands of the control loop of the servo driver can be calculated to synchronize the position commands between the servo driver and the upper controller.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A computer implemented method of calculating recovery commands for a numerical controlled system, the numerical controlled system comprising an upper controller providing position commands to a servo driver to drive a motor, the method comprising:

(a) providing a memory space to store the position commands;

(b) reading a position matrix with k-by-1 elements;

(c) reading a transformation matrix with k-by-k elements;

(d) calculating a plurality of position coefficients of a position polynomial of degree (k−1); and (e) calculating a plurality of position interpolations according to the position polynomial and the position coefficients, wherein the position polynomial is modified to be a modified position polynomial to synchronize the position commands between the servo driver and a control loop of the upper controller, and the position polynomial is expressed as follows:

$$\theta(n)=a_{(k-1)}*n^{(k-1)}+a_{(k-2)}*n^{(k-2)}+a_{(k-3)}*n^{(k-3)}+\ldots+a_1*n+a_0;$$

and variable n of the position polynomial is replaced by variable t to acquire the modified position polynomial, and the modified position polynomial is expressed as follows:

$$\theta(t)=a_{(k-1)}*t^{(k-1)}+a_{(k-2)}*t^{(k-2)}+a_{(k-3)}*t^{(k-3)}+\ldots+a_1*t+a_0$$

wherein t=Ta+n×Ts-Tc, and

Ta is the time of the position commands are initially transmitted to the control loop;

Ts is the time of the position commands are sampled by the control loop; and

Tc is the period of the position commands of the upper controller.

2. The method in claim 1, further comprising:

(f) calculating a velocity polynomial of degree (k−2) and a plurality of velocity coefficients of the velocity polynomial by first differentiating the position polynomial after the step (d); and (g) calculating a plurality of velocity interpolations according to the velocity polynomial and the velocity coefficients.

3. The method in claim 2, further comprising:

(h) calculating an acceleration polynomial of degree (k−3) and a plurality of acceleration coefficients of the acceleration polynomial by first differentiating the velocity polynomial after the step (g); and (i) calculating a plurality of acceleration interpolations according to the acceleration polynomial and the acceleration coefficients.

4. The method in claim 1, wherein the position matrix has k elements that comprises one current position element and (k−1) preceding position elements.

5. The method in claim 1, wherein the position polynomial are multiplied by the transformation matrix to acquire the coefficients of the position polynomial.

6. The method in claim 1, wherein the modified position polynomial is first differentiated to acquire a modified velocity polynomial.

7. The method in claim 6, wherein the modified velocity polynomial is first differentiated to acquire a modified acceleration polynomial.

* * * * *